Nelson et al.

[54] LIGHT PULSE ANALYZING DETECTOR SYSTEM

[75] Inventors: Melvin A. Nelson, Santa Barbara; John C. Clark, Goleta, both of Calif.; Jerry G. Lackey, Charleston Heights, S.C.

[73] Assignee: EG&G, Inc., Bedford, Mass.

[22] Filed: June 11, 1971

[21] Appl. No.: 152,131

[52] U.S. Cl. .................................... 250/199
[51] Int. Cl. ................................... H04b 9/00
[58] Field of Search ............ 250/199, 213 R; 313/75

[56] References Cited
UNITED STATES PATENTS
3,569,616  3/1971  Baker.......................... 250/199 X
3,675,022  7/1972  Nelson et al.................. 250/199

*Primary Examiner*—Raulfe B. Zache
*Attorney*—Ralph L. Cadwallader

[57] ABSTRACT

In the detector system disclosed herein, a transient light signal, such as a modulated laser pulse, is analyzed or demodulated by generating, from the detected light, an electron beam which is linearly scanned across a phosphor screen. A linear array of photodetectors, responsive to the light emitted from corresponding portions of the screen, provide respective electrical signals having amplitudes corresponding to the instantaneous intensity of the light signal at respective times within the transient interval. These electrical signals are integrated and held in respective circuits for subsequent commutation and conversion to digital form.

10 Claims, 3 Drawing Figures

MELVIN A. NELSON
JOHN C. CLARK
JERRY G. LACKEY
INVENTORS

BY Ralph L. Cadwallader
Lawrence P. Benjamin

ATTORNEYS

LIGHT PULSE ANALYZING DETECTOR SYSTEM

The invention described herein was made in the course of work under contract with the U.S. Atomic Energy Commission.

BACKGROUND OF THE INVENTION

This invention relates to a transient light signal detecting system and more particularly to such a system which is useful in electro-optical telemetry systems employing laser light sources.

It has been proposed heretofore to employ laser-based telemetry systems for communicating data from environments which are subject to intense nuclear or electromagnetic radiation fields, particularly when the data to be communicated involves characteristics of a transient phenomenon, e.g., an atomic explosion. One difficulty with such systems is that the data must be abstracted from a transient light signal, e.g., a modulated laser beam, which may be relatively weak or attenuated.

Heretofore, the transient light signal being received has typically been applied to a photodetector so as to obtain a corresponding electrical signal, the resulting electrical signal being then displayed on an oscilloscope where it is photographed to provide a record which can be subsequently studied and analyzed. One such system is disclosed in co-pending application Ser. No. 39,345 filed May 21, 1970 now U.S. Pat. No. 3,675,022 and entitled Electro-optical Telemetry Systems. While the generation of a photographic record provides a continuing record, the delay and manipulation required for use of the photographic medium is a disadvantage in many situations.

Among the several objects of the present invention may be noted the provision of a detection system for transient light signals; the provision of such a system which provides an intensity history of the detected transient light signal; the provision of such a system in which the data defining the intensity history is essentially immediately available; the provision of such a system in which the data is available in digital form; the provision of such a system which is highly sensitive; the provision of such a system which is accurate and which is of relatively simple and inexpensive construction. Other objects and features will be in part apparent and in part pointed out hereinafter.

SUMMARY OF THE INVENTION

Briefly, apparatus according to the present invention operates to provide a plurality of continuing electrical signals which represent the intensity of a transient light signal at respective successive points in time within the transient interval. The optical signal is received or detected by means of a photo-cathode which provides an electron signal proportional to the intensity of the light signal. This electron signal is formed into a beam which is then swept linearly across the phosphor screen during the transient interval. By means of a linear array of photodetectors adjacent the screen, a plurality of signals are generated each of which corresponds to the light emitted from a respective portion of the screen. Each of the photodetectors is provided with a respective circuit means for holding, e.g., by integration, the signal generated by the photodetector for a period substantially longer than the transient interval. Accordingly, a plurality of continuing signals are generated having amplitudes representing the intensity of the optical signal at corresponding points in time within the transient interval.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
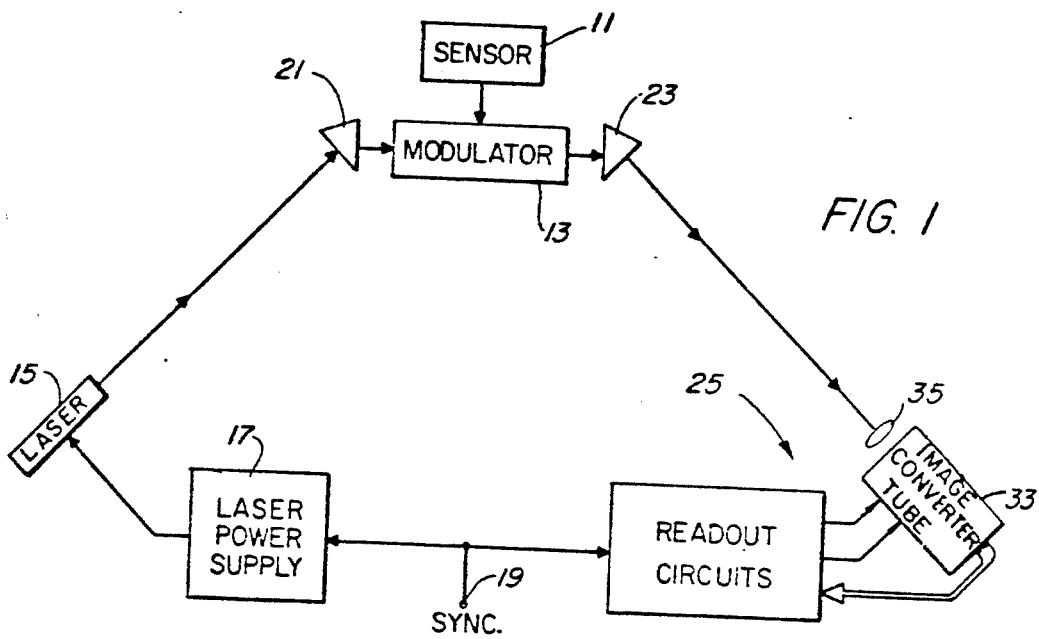
FIG. 1 is a diagrammatic illustration of an electro-optical telemetry system employing a transient light signal detecting system of the present invention.

Referring now to FIG. 1, the overall system illustrated there is arranged for the communication of data acquired from a transient phenomenon occurring in an environment which may be subject to intense nuclear or electromagnetic radiation. A sensor 11 is indicated as the source of such data. In accordance with the practice of the present invention, the data to be communicated is impressed on an optical carrier by means of a modulator 13. Modulator 13 may, for example, comprise a Kerr cell modulator of the type described in the previously identified, co-pending application. Preferably, only the sensor 11, modulator 13 and the associated electronic and optical components are located within the severe environmental field, the generation and detection of the carrier radiation being accomplished outside the severe field.

In the system illustrated in FIG. 1, optical carrier radiation (light) is generated by means of a laser 15. Laser 15 is energized by means of a power supply 17 whose operation is preferably synchronized with the transient event which is to be studied or analyzed, e.g. by means of a suitable sync signal provided at a terminal 19. While laser 15 is assumed to be operated in a so called pulsed so-called it should be understood that the transient phenomenon to be studied will typically take place entirely within a single laser pulse. Thus, the modulator 13 will impress upon the comparatively long pulse, a higher frequency intensity modulation which conveys the data to be communicated. A continuous wave laser of suitable power could also be employed.

The optical carrier energy generated by the laser 15 is directed through the modulator 13 by a suitable optical system, such as mirrors, light pipes or a prism as indicated at 21. Likewise, the modulated optical signal emerging from the modulator 13 is directed back out of the severe environment field by a suitable optical system, indicated generally at 23, where it is picked up and analyzed by a detector system in accordance with the present invention, indicated generally at 25.

Figure 2:
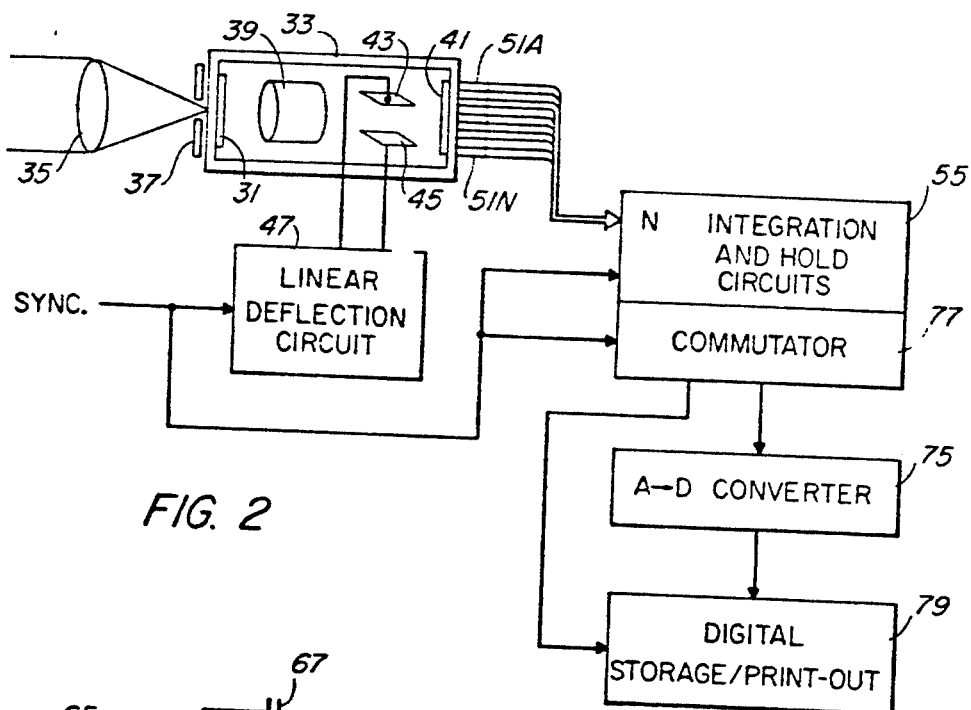
FIG. 2 is a schematic block diagram of the transient light signal detecting system used in the system of FIG. 1.

As illustrated in greater detail in FIG. 2, the modulated light pulse or signal received back at the detector system is focussed on the photo-cathode 31 of an image converter tube 33 by means of a suitable optical system, indicated generally at 35. As the light source is essentially collimated, due either to the nature of the laser or the distance between the modulator and the detector, the received radiation is concentrated essentially at one point on the photo-cathode. A suitable mask 37 may be employed to limit the field of view of this point on the photo-cathode. As is conventional, image converter tube 33 includes an electrostatic lens, indicated very diagrammatically at 39, for forming the electrons emitted from the photo-cathode 31 into a beam or stream focussed on the phosphor screen 41. In other words, the photo-cathode 31 is imaged on the phosphor screen 41. The electrons are also accelerated by a suitable potential gradient produced by an appropriate electrode structure (not shown). As is also conventional, tube 33 includes deflection or image position electrodes. The electrodes permitting deflection on one axis are indicated at 43 and 45 in FIG. 2.

In the practice of the present invention, the image converter tube 33 is operated in the so-called "streak" mode, that is, the beam of electrons formed from the electrons emitted by the photo-cathode 31, is swept across the phosphor screen 41 as a function of time. In FIG. 2, a suitable linear deflection circuit for providing suitable deflection voltages to the electrodes 43 and 45 is indicated at 47. The synchronization signal which controls the generation of the laser pulse is also applied to the deflection circuit 47 so that the scanning of the electron beam in the image conversion tube is suitably synchronized with the transmitted and received optical pulses.

Mounted closely adjacent the phosphor screen 41 is a linear array of photodetectors 51A-51N. The axis of the linear array is aligned with the direction of beam sweep produced by the deflection electrodes 43 and 45 and the array is positioned so that the photodetectors 51A-51N respond to the streak of light produced by the sweep of the electron beam across phosphor screen 41. In the embodiment illustrated in FIG. 2, the photodetectors 51A-51N are assumed to be in such close proximity to the phosphor screen 41 that each photodetector is responsive to the light generated by a corresponding portion of the screen. However, it should be understood that the screen could be imaged upon the detector array by means of a suitable optical system so as to provide the desired correspondence of individual detectors with respective portions of the screen 41 and that the detectors should likewise be considered to be "adjacent" the screen in such an arrangement.

Each of the photodetectors 51A-51N is interconnected with and essentially incorporated into a respective integration and hold circuit, these circuits being indicated generally at 55. Each of the respective holding or integration circuits operates to provide a continuing electrical signal which is essentially proportional to the integrated value of light received by the respective photodetector during a given sweep or streak of the electron beam in the image converter tube 33.

Figure 3:
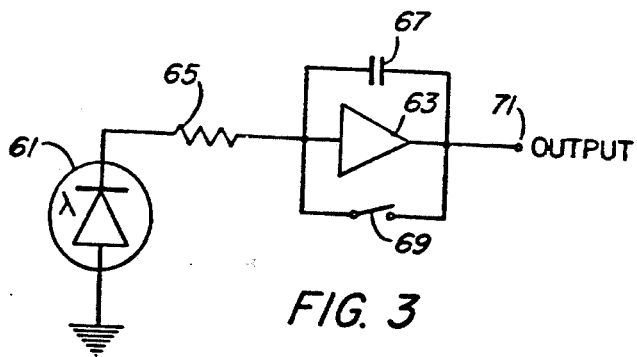
FIG. 3 is a somewhat schematic circuit diagram of an individual photodetector and associated holding circuit employed in the detector system of FIG. 2.

Assuming that the photodetectors 51A-51N are photodiodes, a suitable integration and holding circuit is illustrated in FIG. 3. The photodetector diode 61 is connected to the input of an integrating amplifier 63, e.g., through a resistance 65, and a charge-storage capacitor 67 is connected between the output and input of the amplifier. As will be apparent to those skilled in the art, this is essentially a conventional sample-and-hold circuit with the photo-detector acting as signal source and sampling gate. The sync signal is employed to reset all of the integration and holding circuits 55 at the start of a sweep or streak cycle and, in FIG. 3, the resetting circuit is represented as comprising merely a simple switch 69 shunting the charge-storage capacitor 67. However, as will also be understood by those skilled in the art, this switch will, in practice, be preferably constituted by an electronic switching circuit such as a field-effect transistor. The circuit of FIG. 3 operates to provide, at an output terminal 71, an electrical signal having an amplitude which is proportional to the amount of light received by the photodiode 61, which signal voltage continues or persists substantially longer than the sweep interval, i.e., the persistence is limited only by the leakage of the capacitor 67 and the bias current and stability characteristics of the amplifier 63.

The output signals provided by the several integration and hold circuits 55 are applied in sequence to an analog-to-digital converter 75 by means of a commutator 77. The timed sequence of operation of the commutator is preferably initiated by the same sync signal which initiates the beam sweep and the resetting of the integration and hold circuits. However, the continuing nature of the multiple output signals provided by the holding circuits 55 allows this sequencing and conversion to take place over a relatively long interval as compared with the transient event and streak period which may be in the order of 10 microseconds. As these various amplitude samples are successively converted to digital form, they may be printed out, e.g., on paper or magnetic tape, or entered into storage in conventional manner. As the amplitude samples are available on a continuing basis, that is, on a time scale which is long in comparison with the original transient optical signal, they may be readily converted to digital form and entered into storage at a speed which is compatible with the requirements of the core memories typically associated with digital computers. The storage and/or printing out may, of course, be coordinated with the operation of the commutator 77 in conventional manner to facilitate identification and correlation of the several samples.

As may be seen, the resolution of the system, i.e. the number of samples which can be obtained for a given transient optical signal, is limited substantially only by the optical resolution of the image conversion tube and the size of the individual photodetectors 51A-51N which make up the linear array. Since the array comprises only a linear arrangement of individual photodetectors, rather than a two-dimensional matrix, it can be seen that the array can be relatively easily fabricated using conventional integrated circuit techniques to obtain a relatively large number of individual detectors for a given streak length. Thus, high resolution can be obtained.

While the optical carrier radiation utilized has been referred to herein as "light," this term should be interpreted to include infra-red and ultra-violet radiation as well as visible light. Likewise, while photodiodes have been shown and described by way of illustration, it should be understood that other types of photodetectors, such as PIN diodes or photo-FETs (photo field-effect transistors), may also be used. In the case of the photo field-effect transistors, an additional advantage obtainable is that the gain of the transistor itself may be utilized in the integration and hold circuitry so that the overall construction is simplified.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for providing a plurality of continuing electrical signals representing the intensity of a transient light signal at respective successive points in time within the transient interval, said apparatus comprising:
   a photo-cathode for receiving said optical signal and providing an electron signal proportional thereto;
   a phosphor screen adapted to receive impinging electrons and to emit light in proportion to the intensity of the impinging electrons;
   means for directing towards said screen a stream of electrons having an intensity proportional to said electron signal;
   a linear array of photodetectors adjacent said screen, each photodetector being responsive to light emitted from a corresponding portion of said screen, each of said photodetectors being provided with circuit means for holding a signal proportional to the signal generated by the respective photodetector for a period substantially longer than said transient interval; and
   means for sweeping said stream of electrons across the portion of said screen adjacent said array as a function of time during said transient interval thereby to generate in each of said circuit means a respective held electrical signal having an amplitude corresponding to the intensity of the optical signal at a corresponding point in time within the transient interval.

2. Apparatus for providing digital data representing the intensity history of a transient light signal, said apparatus comprising:
   a photo-cathode for receiving said optical signal and providing an electron signal essentially proportional thereto;
   a phosphor screen adapted to receive impinging electrons and to emit light in proportion to the intensity of the impinging electrons;
   means for directing towards said screen a stream of electrons having an intensity proportional to said electron signal;
   a linear array of photodetectors adjacent said screen, each photodetector being responsive to light emitted from a corresponding portion of said screen;
   a plurality of integrator circuits, each incorporating a respective one of said photodetectors and operating to provide a continuing signal having an amplitude which is a function of the light energy received by the respective photodetector;
   means for sweeping said stream of electrons across the portion of said screen seen by said array as a function of time during said transient interval thereby to generate in each of said integrator circuits a respective, held electrical signal having an amplitude corresponding to the intensity of said light signal at a corresponding point in time within the transient interval;
   an analog to digital converter; and
   means for applying said held signals in sequence to said converter thereby to provide digital data representing the intensity history of said light signal.

3. Apparatus as set forth in claim 2 wherein said photodetectors comprise photodiodes.

4. Apparatus as set forth in claim 2 wherein said photodetectors comprise photo field-effect transistors.

5. Apparatus as set forth in claim 2 wherein said linear array of photodetectors comprises a plurality of detectors within a single integrated circuit.

6. Apparatus as set forth in claim 2 wherein said photocathode, said phosphor screen, and said electron stream forming means comprise portions of an image converter tube.

7. Apparatus as set forth in claim 2 wherein said integrator circuits each comprise an amplifier and a charge storage capacitor connecting the output of the amplifier to its input.

8. An electro-optical telemetry system for communicating data concerning a transient phenomenon acquired by a sensor which is remote from a desired data acquisition location, said system comprising:
   an optical modulator interconnected with said sensor for modulating incident light as a function of data, concerning said transient phenomenon, acquired by said sensor;
   a laser provided with means for energizing said laser to produce light during the transient intervale, said light being directed through said modulator;
   an image converter tube disposed to receive the light directed through said moudlator and having a photo-cathode, a phosphor screen, and means for accelerating electrons emitted from said cathode and focussing the resultant electron stream on said screen;
   means for operating said image converter tube in the streak mode in which said electron stream is swept essentially linearly across said screen thereby producing a light streak having a brightness at each point along its length corresponding to the intensity of the electron stream at a corresponding point in time within the streak period;
   means for synchronizing the image converter tube sweep with the operation of said laser;
   a linear array of photodetectors, each photodetector being responsive to light emitted from a respective portion of said screen covered by said streak; and
   a plurality of integrator circuits, each incorporating a respective one of said photodetectors and operating to provide a continuing signal having an amplitude which is a function of the light energy received by the respective photodetector, whereby the amplitude of each such signal corresponds to the intensity of the modulated laser signal at a corresponding point in time within the transient interval.

9. A system as set forth in claim 8 wherein said modulator comprises a Kerr cell.

10. An electro-optical telemetry system for communicating data concerning a transient phenomenon acquired by a sensor which is remote from a desired data acquisition location, said system comprising:
   an optical modulator responsive to said sensor for modulating incident light as a function of data, concerning said transient phenomenon, acquired by said sensor;

a laser provided with means for energizing said laser to produce light during the transient interval, said light being directed through said modulator;

a photo-cathode for receiving laser light, modulated by said modulator, at a location remote from said sensor and providing an electron signal essentially proportional to that light;

a phosphor screen adapted to receive impinging electrons and to emit light in proportion to the intensity of the impinging electrons;

means for directing towards said screen a stream of electrons having an intensity proportional to said electron signal;

a linear array of photodetectors adjacent said screen, each photodetector being responsive to light emitted from a corresponding portion of said screen;

a plurality of integrator circuits, each incorporating a respective one of said photodetectors and operating to provide a continuing signal having an amplitude which is a function of the light energy received by the respective photodetector;

means for sweeping said stream of electrons across the portion of said screen seen by said array as a function of time during said transient interval thereby to generate in each of said integrator circuits a respective, held electrical signal having an amplitude corresponding to the intensity of the modulated laser light at a corresponding point in time within the transient interval;

an analog to digital converter; and means for applying said held signals in sequence to said converter thereby to provide in digital form data obtained by said sensor.

* * * * *